P. S. WISEMAN.
GRAIN-TALLIES.
No. 191,503.  Patented May 29, 1877.
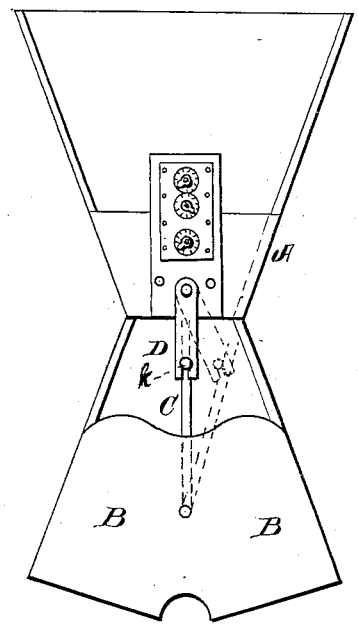
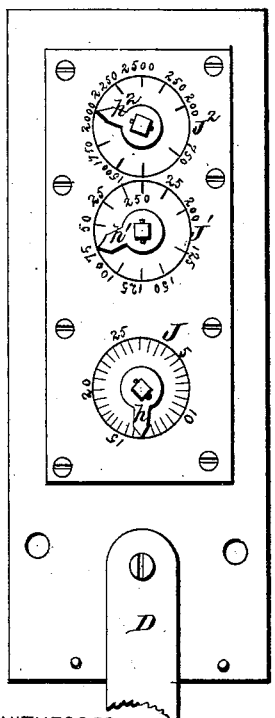
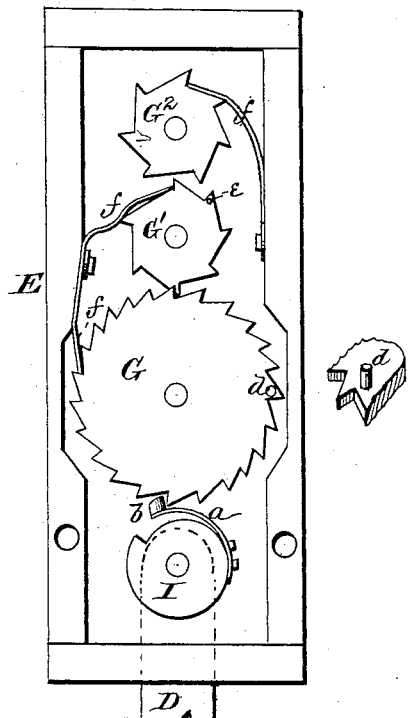
WITNESSES
Franck L. Ourand
H. N. Miller
INVENTOR
Philip S. Wiseman
ATTORNEYS.

UNITED STATES PATENT OFFICE.

PHILIP S. WISEMAN, OF TOLEDO, OHIO.

IMPROVEMENT IN GRAIN-TALLIES.

Specification forming part of Letters Patent No. 191,503, dated May 29, 1877; application filed March 26, 1877.

*To all whom it may concern:*

Be it known that I, PHILIP S. WISEMAN, of Toledo, in the county of Lucas and in the State of Ohio, have invented certain new and useful Improvements in Grain-Registers; and do hereby declare that the following is a full, clear, and exact description thereof, reference being had to the accompanying drawings, and to the letters of reference marked thereon, making a part of this specification.

The nature of my invention consists in the construction and arrangement of a grain or seed register for registering the number of bushels as the grain comes from the thrashing-machine, fanning-mill, sheller, huller, or any other machine where the grain is taken away in measure, and may also be applied to automatic measuring-machines where the grain is weighed instead of measured.

In order to enable others skilled in the art to which my invention appertains to make and use the same, I will now proceed to describe its construction and operation, referring to the annexed drawing, in which—

Figure 1 is a front view of the double discharge-spout of a thrashing-machine with my improved grain-register applied thereto. Fig. 2 is an enlarged front view of the grain-register, and Fig. 3 is an interior view of the same.

A represents the discharge-spout of a thrashing-machine with two branches or outlets, B B, and an interior shifting-valve or cut-off for conducting the grain to either of the outlets.

E represents a box or case, of any suitable dimensions, attached to the spout A, and inclosing the registering mechanism.

D is the operating lever or handle on the outside of the case E, attached to the journal of a wheel, I, placed within said case at or near the bottom. This wheel I is cut out on one side, as shown in Fig. 3, and has a spring, $a$, attached to it. To the outer end of this spring is attached a beveled lug, $b$, which takes into and operates a ratchet-wheel, G, when the lever D is turned in one direction, while, when the lever is turned in the other direction, the inclined face of the lug slides over the teeth of the ratchet-wheel.

From the side of one of the teeth on said wheel projects a pin, $d$, which, during one revolution of the wheel G, takes into and moves a second ratchet-wheel, $G^1$, the distance of one of its teeth.

In like manner, a pin, $e$, on the wheel $G^1$ turns a third wheel, $G^2$, the distance of one tooth for each revolution of said wheel $G^1$.

In the device shown in the drawing a pin, K, projecting from the movable valve or partition C, passes through a slot in the lever or handle D, so that when said valve is changed to flow the grain into the second half-bushel after the first is filled, it sets the dog or lug $b$ ready to move the dial. When this measure is full the valve C is again thrown over, which registers one bushel.

On the outer surface of the box E is a dial-plate with three dials, J $J^1$ $J^2$, corresponding with the three ratchet-wheels G $G^1$ $G^2$, and on the projecting journals of said wheels are secured, respectively, the fingers or indexes $h$ $h^1$ $h^2$, as shown.

The first dial J is marked to count either half or whole bushels up to twenty-five, fifty, or one hundred, as desired, by one revolution of the first ratchet-wheel G. The next dial $J^1$ then registers this quantity, being, in this instance, twenty-five bushels. This dial then receives the count, by twenty-five bushels, up to two hundred and fifty bushels, when this count is transferred to the third dial $J^2$ in the same manner, and this dial then continues the register up to two thousand five hundred bushels, which may in turn be transferred to still a fourth dial in the same manner to any desired limit.

The lever D which moves the wheels, may be made of any suitable shape or length, to be worked either by hand or automatically.

$f f$ are springs or springs-pawls, arranged to prevent any backward movement of the ratchet-wheels.

Having thus fully described my invention, what I claim as new, and desire to secure by Letters Patent, is—

The wheel I, cut out on one side, and provided with the spring $a$ and lug $b$, in combination with the ratchets G $G^1$, having pins $d$ $e$, the ratchet $G^2$, the dials and fingers, and the branched discharge-spout A, having valve C, all constructed substantially as set forth.

In testimony that I claim the foregoing I have hereunto set my hand this 12th day of March, 1877.

PHILIP S. WISEMAN.

Witnesses:
 A. T. BARNES,
 W. F. THOMPSON.